United States Patent
Joyce et al.

(10) Patent No.: US 9,256,651 B1
(45) Date of Patent: Feb. 9, 2016

(54) INHERITANCE OF PROPERTIES FILES WITH LOCALE CHAIN SUPPORT

(71) Applicant: EMC Corporation, Hopkinton, MA (US)

(72) Inventors: Scott E. Joyce, Foxboro, MA (US); Timothy Cox, Mendon, MA (US); Donald Labaj, Northborough, MA (US); Norman M. Miles, Bedford, MA (US)

(73) Assignee: EMC Corporation, Hopkinton, MA (US)

( * ) Notice: Subject to any disclaimer, the term of this patent is extended or adjusted under 35 U.S.C. 154(b) by 289 days.

(21) Appl. No.: 14/035,664

(22) Filed: Sep. 24, 2013

(51) Int. Cl.
*G06F 3/00* (2006.01)
*G06F 17/30* (2006.01)
*G06F 3/0481* (2013.01)
*G06F 3/0484* (2013.01)
*G06F 9/44* (2006.01)

(52) U.S. Cl.
CPC ........ *G06F 17/30554* (2013.01); *G06F 3/0481* (2013.01); *G06F 3/04847* (2013.01); *G06F 9/4448* (2013.01)

(58) Field of Classification Search
CPC ....... G06F 8/43; G06F 9/4448; G06F 3/0481; G06F 3/04847; G06F 17/211
USPC .......................................................... 715/703
See application file for complete search history.

(56) References Cited

U.S. PATENT DOCUMENTS

| | | | |
|---|---|---|---|
| 5,608,860 A | 3/1997 | Fitzpatrick et al. | |
| 5,701,137 A | 12/1997 | Kiernan et al. | |
| 5,742,286 A | 4/1998 | Kung et al. | |
| 5,754,179 A | 5/1998 | Hocker et al. | |
| 5,774,120 A | 6/1998 | Goddard et al. | |
| 5,835,768 A * | 11/1998 | Miller .................... | G06F 9/4448 713/1 |
| 5,848,272 A | 12/1998 | Breggin et al. | |
| 5,848,424 A | 12/1998 | Scheinkman et al. | |
| 6,339,755 B1 * | 1/2002 | Hetherington .......... | G06F 17/21 704/8 |
| 6,393,429 B1 | 5/2002 | Yagi et al. | |
| 6,492,995 B1 * | 12/2002 | Atkin ..................... | G06F 3/0486 715/703 |
| 6,944,829 B2 | 9/2005 | Dando | |
| 7,120,646 B2 | 10/2006 | Streepy, Jr. | |
| 7,254,385 B2 | 8/2007 | Atkin et al. | |
| 7,293,237 B1 | 11/2007 | Knight et al. | |
| 7,532,340 B2 | 5/2009 | Koppich et al. | |

(Continued)

OTHER PUBLICATIONS

Scott Joyce, et al.; "Specifying Sizes for User Interface Elements"; U.S. Appl. No. 14/034,810, filed Sep. 24, 2013.

(Continued)

*Primary Examiner* — Tadeese Hailu
(74) *Attorney, Agent, or Firm* — BainwoodHuang

(57) ABSTRACT

A method is provided of displaying a GUI of a first dialog. The method includes, for a localizable display element of a set of localizable display elements of the first dialog, each element having an element name, (a) searching through a first chain of properties files of the first dialog for a display term mapped to by the element, (b) in response, determining that the display term is not found within the first chain, (c) in response, further searching through a second chain of properties files associated with a second dialog for the display term, the first chain being pre-configured to inherit properties from the second chain, and (d) when the display term is found within the second chain, displaying the display term found within the second chain in place of the localizable display element of the first dialog box on the GUI of the first dialog.

13 Claims, 4 Drawing Sheets

(56) References Cited

U.S. PATENT DOCUMENTS

| | | | |
|---|---|---|---|
| 7,610,548 B1* | 10/2009 | Brinkman | G06F 17/248 707/999.103 |
| 8,413,114 B1 | 4/2013 | Joyce et al. | |
| 2002/0003548 A1 | 1/2002 | Krusche et al. | |
| 2002/0196271 A1 | 12/2002 | Windl et al. | |
| 2003/0066032 A1 | 4/2003 | Ramachandran et al. | |
| 2003/0110469 A1 | 6/2003 | Jackson | |
| 2003/0160810 A1 | 8/2003 | Talley et al. | |
| 2003/0160825 A1 | 8/2003 | Weber | |
| 2003/0179225 A1* | 9/2003 | Nettles | G06F 9/4448 715/703 |
| 2004/0001094 A1 | 1/2004 | Unnewehr et al. | |
| 2013/0174027 A1* | 7/2013 | Atkin | G06F 9/4448 715/255 |

OTHER PUBLICATIONS

Scott Joyce, et al.; "Object Building for an Aggregate Object Class Request"; U.S. Appl. No. 13/076,925, filed Mar. 31, 2011.

* cited by examiner

INHERITANCE OF PROPERTIES FILES WITH LOCALE CHAIN SUPPORT

RELATED APPLICATION

This Disclosure may be considered to be related to another disclosure, entitled "Specifying Sizes for User Interface Elements," filed on even date herewith with the United States Patent and Trademark Office as a Patent Application, the first named inventor being Scott E. Joyce.

BACKGROUND

Graphical user interfaces (GUIs) often utilize dialog boxes to seek user input. In order to allow the dialog boxes to be localized to different languages and other localized configurations, some developers distribute each dialog box with one or more localized properties files to allow features of each dialog box to be properly localized.

SUMMARY

The above-described conventional systems for localizing dialog boxes suffers from deficiencies. For example, the developer is required to provide separate properties files for each dialog box even if some dialog boxes share common features; this can lead to inconsistent translations between similar features of different dialog boxes, and it also increases the translation burden on the translators.

Thus, it would be desirable to alleviate these concerns by permitting dialog boxes to inherit from one another so that common features may be easily harmonized across several related dialog boxes. Thus, embodiments are directed to techniques for enabling inheritance of properties files between related dialog boxes of a GUI while also providing for localization.

One embodiment is directed to a method of displaying a graphical user interface (GUI) of a first dialog box on a display screen of a computing device. The method includes, for a localizable display element of a set of localizable display elements of the first dialog box, each localizable display element having a non-localized element name, (a) searching through a first chain of properties files of the first dialog box for a display term mapped to by the non-localized element name of the localizable display element, (b) in response to searching through the first chain of properties files, determining that the display term mapped to by the non-localized element name of the localizable display element is not found within the first chain of properties files, (c) in response to determining that the display term mapped to by the non-localized element name of the localizable display element is not found within the first chain of properties files, further searching through a second chain of properties files associated with a second dialog box for the display term mapped to by the non-localized element name of the localizable display element, the first chain of properties files being pre-configured to inherit properties from the second chain of properties files, and (d) when the display term mapped to by the non-localized element name of the localizable display element is found within the second chain of properties files, displaying the display term mapped to by the non-localized element name of the localizable display element found within the second chain of properties files in place of the localizable display element of the first dialog box on the GUI of the first dialog box on the display screen of the computing device. Other embodiments are directed to a computerized apparatus and a computer program product for performing methods similar to that described above.

BRIEF DESCRIPTION OF THE DRAWINGS

The foregoing and other objects, features and advantages will be apparent from the following description of particular embodiments of the present disclosure, as illustrated in the accompanying drawings in which like reference characters refer to the same parts throughout the different views. The drawings are not necessarily to scale, emphasis instead being placed upon illustrating the principles of various embodiments of the present disclosure.

DETAILED DESCRIPTION

Embodiments are directed to techniques for enabling inheritance of properties files between related dialog boxes of a graphical user interface (GUI) while also providing for localization.

Figure 1:
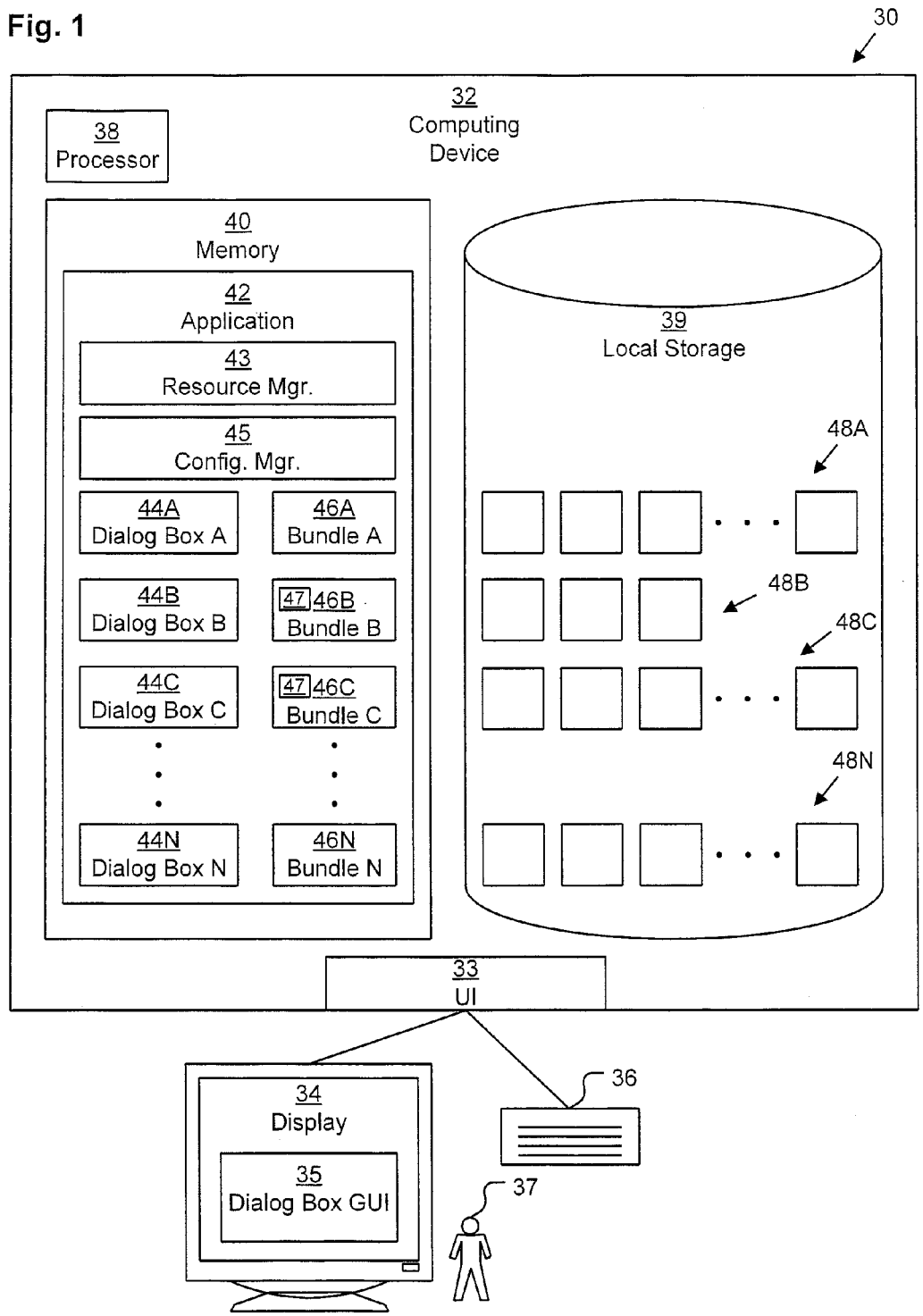
FIG. 1 depicts an example system for use in performing various embodiments.

FIG. 1 depicts an example system 30. System 30 includes a computing device 32 which connects to a display 34 and an input device 36 via a user interface (UI) 33. UI 33 allows the computing device 32 to interact with a user 37 by displaying a dialog box GUI 35 (as well as various other GUI elements) to the user 37 on the display 34 and receiving instructions from the user 37 via the input device 36. Display 34 may be any kind of display device capable of displaying a GUI, such as, for example, a cathode ray tube, a liquid crystal display, a projection device, a plasma display, or a similar device as is well-known in the art. Display 34 may also include more than one display device, each of which may use the same or different display technologies. Input device 36 may include any kind of user input devices such as, for example, a keyboard, a keypad, a mouse, a trackpad, a tracking ball, a pen-based digitizer, a stylus-based digitizer, or a similar device as is well-known in the art. Input device 36 may also include more than one user input device. In some embodiments, display 34 and user input device 36 may be combined into a single device, such as, for example, a touch-sensitive display screen. UI 33 may include one or more of a graphics adapter, a touch-based input controller, a mouse interface, a keyboard interface, a universal serial bus, or other similar devices.

Computing device 32 may be any kind of computing device, such as, for example, a personal computer, a server computer, an enterprise server computer, a workstation computer, a cellular phone, a smart phone, a tablet, a laptop computer, etc. Computing device 32 also includes a processor 38, local storage 39, and memory 40.

Processor 38 may be any kind of processor or set of processors configured to perform operations, such as, for example, a microprocessor, a multi-core microprocessor, a digital signal processor, a collection of electronic circuits, or any combination of the above.

Memory 40 may be any kind of digital system memory, such as, for example, RAM. Memory 40 stores programs and applications (e.g., mobile apps) executing on processor 38 as well as data used by those programs. Memory 40 stores an operating system (not depicted) as well as various other software modules (some of which may be independent applications, while others are parts of other applications or the operating system).

Memory 40 thus includes one or more client applications 42 configured to display various dialog boxes 44 (depicted as dialog boxes 44A, 44B, 44C, . . . , 44N) within dialog box GUI 35 of display 34. Each dialog box 44 may be thought of as a logical object (e.g., an instantiation of a class within an object-oriented programming language) configured to display a particular dialog box GUI 35. Each dialog box 44 is associated with a bundle 46 (depicted as bundles 46A, 46B, 46C, . . . , 46N) of properties files 48 (depicted as sets of properties files 48A, 48B, 48C, . . . , 48N stored within storage 39, each set being associated with a particular bundle 46) chained together and loaded into memory 40. Resource manager 43 is a software module of application 42 configured to load and assemble each bundle 46 in association with its respective dialog box 44 (e.g., bundle A is associated with dialog box A, bundle B is associated with dialog box B, etc.) based upon a configuration provided by configuration manager 45. Configuration manager 45 is a software module of application 42 configured to provide a localization order for the application 42. Thus, for example, configuration manager 45 may be configured to provide that the localization order is first Spanish (es) followed by English for default properties. In another example, configuration manager 45 may be configured to provide that the localization order is first original equipment manufacturer (OEM)-specific Spanish (es.oem) followed by generic Spanish (es) followed by OEM-specific English (oem) followed by English for default properties. This latter example allows licensed OEM vendors to localize terminology displayed within dialog box GUIs 35 for various dialog boxes 44 to display terms unique or specific to that particular vendor. In addition to each bundle 46 having a localization order provided by the configuration manager 45, one or more of the bundles 46 also has an inheritance instruction 47 (as depicted, bundles 46B and 46C have inheritance instructions 47) which allows that bundle 46 to inherit properties from properties files 48 within a bundle 46 of another dialog box 44.

Memory 40 may include both a system memory portion for storing programs and data in active use by the processor 38 as well as a persistent storage portion (e.g., solid-state storage and/or disk-based storage) for storing programs and data even while the computing device 32 is powered off. The operating system and the software modules (e.g., 43, 44, 45) are typically stored both in system memory and in persistent storage so that they may be loaded into system memory from persistent storage upon a system restart. Software modules 43, 44, 45, when stored in non-transient form either in system memory or in persistent storage, form a computer program product. The processor 38 running one or more of these software modules 43, 44, 45 thus forms a specialized circuit constructed and arranged to carry out the various processes described herein.

In some embodiments, various components of the computing device 32 (e.g., the processor 38, graphics adapter for the UI 33, various ancillary components, etc.) may be integrated into a single integrated circuit as a system on a chip (SoC), as is known in the art.

Figure 2:
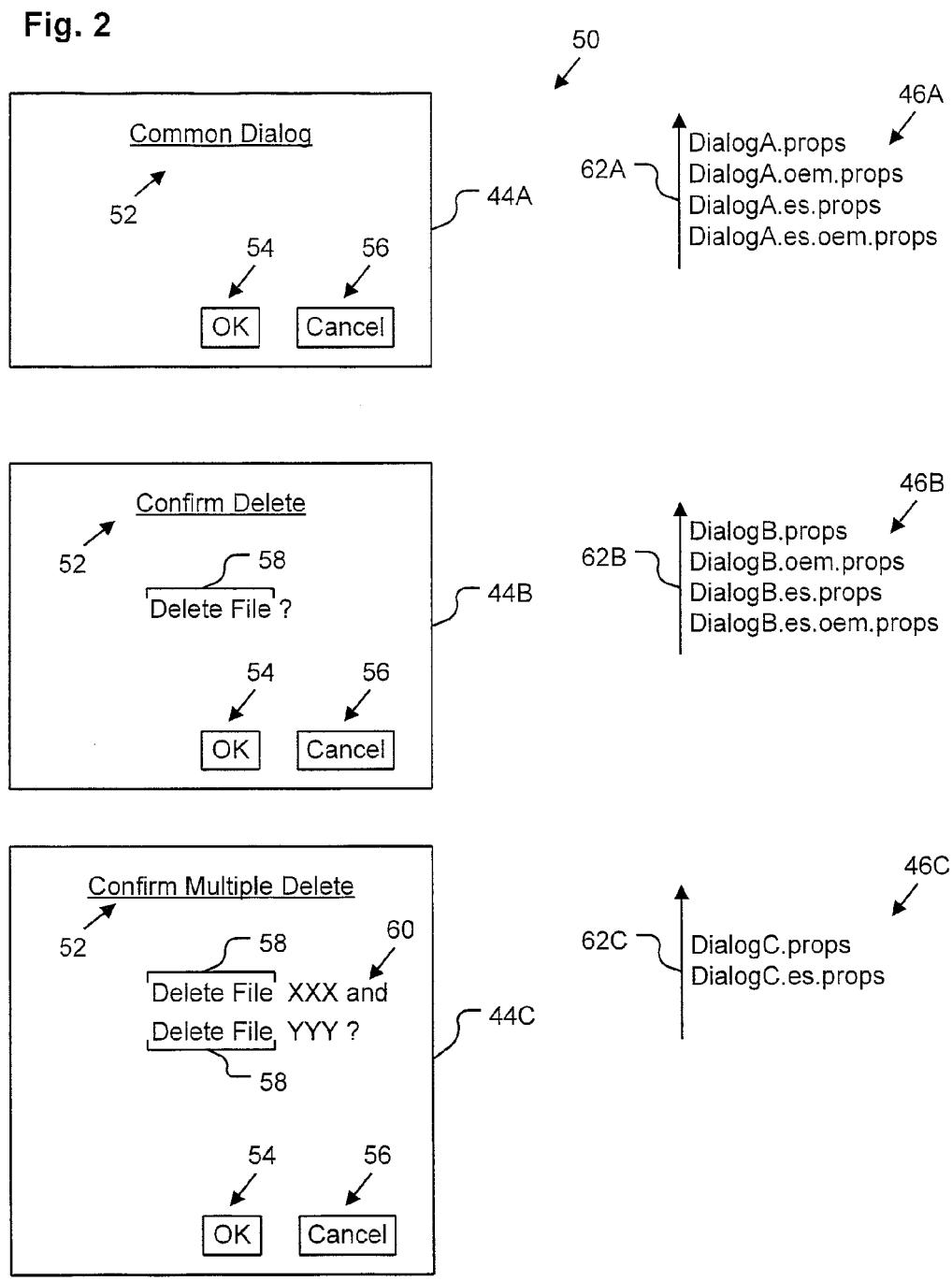
FIG. 2 depicts an example inheritance of dialog boxes according to various embodiments.

FIG. 2 depicts an example set 50 of related dialog boxes 44 and associated bundles 46. As depicted, parent dialog box 44A includes various localizable display elements 52, 54, 56. In a default (English) configuration, the title element 52 displays as "Common Dialog," the OK element 54 displays as "OK," and the cancel element 56 displays as "Cancel." However, localization with reference to associated bundle 46A may allow one or more of the localizable display elements 52, 54, 56 to display differently. Thus, bundle 46A includes a set 48A of properties files 48 arranged in a chain order 62A (generically chain order 62) that prioritizes Spanish over English. So, when the parent dialog box 44A is to be displayed as dialog box GUI 35, parent dialog box 44A issues a call to resource manager 43 to localize each localizable display element 52, 54, 56 with respect to the set 48A of properties files 48 according to the chain order 62A. Thus, in order to display OK element 54, resource manager 43 first searches DialogA.es.oem.props for an OK property, and, if none is found, resource manager 43 continues to search DialogA.es.props for an OK property, followed by DialogA.oem.props and then DialogA.props. In some embodiments, each properties file 48 is arranged as a set of key-value pairs. Table 1 includes example code for the properties files 48 of the set 48A associated with parent dialog box 44A.

TABLE 1

Properties files for parent dialog box

DialogA.props:
   OK = "OK"
   Cancel = "Cancel"
   Title = "Common Dialog"
DialogA.oem.props:
   Title = "OEM Common Dialog"
DialogA.es.props:
   Title = "Diálogo ComOn"
   Cancel = "Cancelar"
DialogA.es.oem.props:
   Title = "Dialogo ComOn de OEM"

Thus, although the OK element 54 displays according to the default English even for Spanish and OEM systems, the cancel element 56 displays differently in Spanish, and the title element 52 varies between all combinations of English/Spanish and OEM/non-OEM.

As depicted, intermediate dialog box 44B includes various localizable display elements 52, 54, 56, 58. In the default (English) configuration, elements 52, 54, and 56 display as in parent dialog box 44A. New deletion confirmation element 58 displays as "Delete File." However, localization with reference to associated bundle 46B may allow one or more of the localizable display elements 52, 54, 56, 58 to display differently. Thus, bundle 46B includes a set 48B of properties files 48 arranged in a chain order 62B (generically chain order 62) that prioritizes Spanish over English. So, when the intermediate dialog box 44B is to be displayed as dialog box GUI 35, intermediate dialog box 44B issues a call to resource manager 43 to localize each localizable display element 52, 54, 56, 58 with respect to the set 48B of properties files 48 according to the chain order 62B. Thus, in order to display OK element 54, resource manager 43 first searches DialogB.es.oem.props for an OK property, and, if none is found, resource manager 43 continues to search DialogB.es.props for an OK property, followed by DialogB.oem.props and then DialogB.props. In some embodiments, each properties file 48 is arranged as a set of key-value pairs. Table 2 includes example code for the properties files 48 of the set 48B associated with intermediate dialog box 44B.

TABLE 2

Properties files for intermediate dialog box

DialogB.props:
    #inherit DialogA
    Title = "Confirm Delete"
    DeletionConfirmation = "Delete File"
DialogB.oem.props:
    Title = "OEM Confirm Delete"
Dialog B. es. props:
    Title = "Confirmar Borrado"
    DeletionConfirmation = "Borrar el Archivo"
DialogB.es.oem.props:
    Title = "Confirmar Borrado de OEM"

Because the OK element 54 is not defined within any of the properties files 48 of the set 48B associated with intermediate dialog box 44B, resource manager 43 looks for an inherit instruction. As shown in Table 2, the DialogB.props file includes an inherit statement indicating inheritance from parent dialog box 44A. Thus, resource manager 43 continues to search bundle 46A for the OK property, ultimately finding it within DialogA.props. However, deletion confirmation element 58 displays differently in Spanish, and the title element 52 varies between all combinations of English/Spanish and OEM/non-OEM.

As depicted, child dialog box 44C includes various localizable display elements 52, 54, 56, 58 (twice), and 60. In the default (English) configuration, elements 52, 54, 56, and 58 display as in intermediate dialog box 44B. New conjunction element 60 displays as "and." However, localization with reference to associated bundle 46B may allow one or more of the localizable display elements 52, 54, 56, 58, 60 to display differently. Thus, bundle 46C includes a set 48C of properties files 48 arranged in a chain order 62C (generically chain order 62) that prioritizes Spanish over English. So, when the child dialog box 44C is to be displayed as dialog box GUI 35, child dialog box 44C issues a call to resource manager 43 to localize each localizable display element 52, 54, 56, 58, 60 with respect to the set 48C of properties files 48 according to the chain order 62C. However, as depicted, OEM properties files are absent from the storage 39 for child dialog box 44C, so chain order 62C only has two properties files. In some embodiments, each properties file 48 is arranged as a set of key-value pairs. Table 3 includes example code for the properties files 48 of the set 48C associated with child dialog box 44C.

TABLE 3

Properties files for child dialog box

DialogC.props:
    #inherit DialogB
    Title = "Confirm MultipleDelete"
    And = "and"
DialogC.es.props:
    Title = "Confirmar Varios Borrados"
    And = "y"

Because the OK element 54 is not defined within any of the properties files 48 of the set 48C associated with child dialog box 44C, resource manager 43 looks for an inherit instruction. As shown in Table 3, the DialogC.props file includes an inherit statement indicating inheritance from intermediate dialog box 44B. Thus, resource manager 43 continues to search bundle 46B for the OK property. However, as before, since the OK element 54 is not defined within any of the properties files 48 of the set 48B associated with intermediate dialog box 44B, inheritance proceeds to the bundle 46A of parent dialog box 44A.

In another arrangement, instead of child dialog box 44C inheriting from intermediate dialog box 44B, which, in turn, inherits from parent dialog box 44A, a similar result can be achieved by child dialog box 44C first inheriting from intermediate dialog box 44B, and then child dialog box 44C further inheriting directly from parent dialog box 44A. In another, less efficient arrangement, both child dialog box 44C and intermediate dialog box 44B may inherit from parent dialog box 44A; in such an arrangement, parent dialog box 44A will be searched twice.

Figure 3:
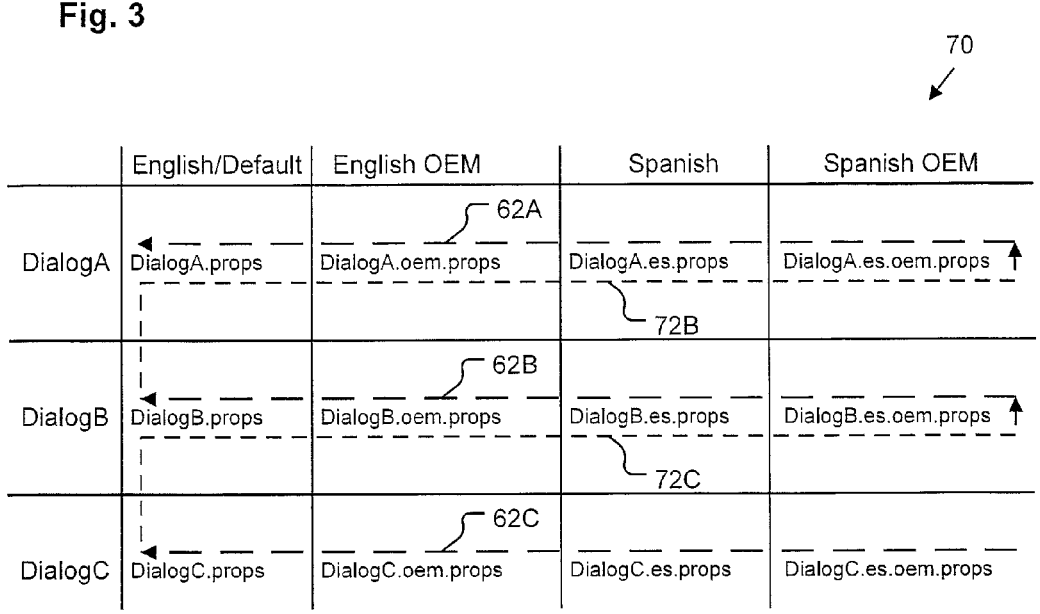
FIG. 3 depicts an example inheritance matrix according to various embodiments.

FIG. 3 depicts a similar result using an inheritance matrix 70. In order to display a localizable display element 52, 54, 56, 58, 60 of child dialog box 44C, resource manager 43 first searches the properties files 48 of the local child bundle 46C according to order 62C. Upon not finding a localization for localizable display element 52, 54, 56, 58, 60 within child bundle 46C, inheritance order 72C proceeds towards searching the properties files 48 of the intermediate bundle 46B according to intermediate order 62B. Upon not finding a localization for localizable display element 52, 54, 56, 58, 60 within intermediate bundle 46B, inheritance order 72B proceeds towards searching the properties files 48 of the parent bundle 46A according to parent order 62A.

Figure 4:
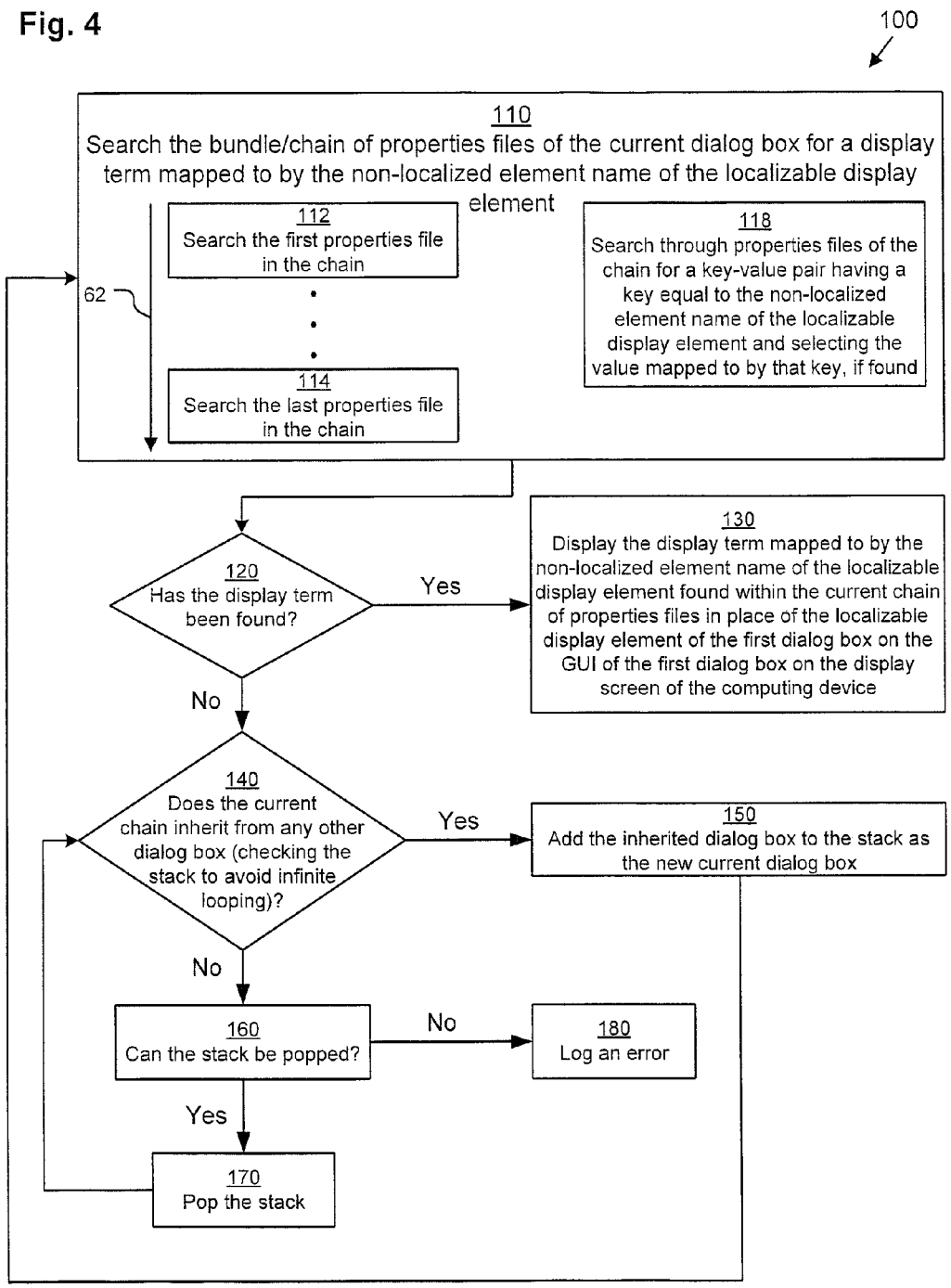
FIG. 4 depicts an example method according to various embodiments.

FIG. 4 illustrates, as method 100, the operation of resource manager 43 on computing device 32 for displaying a localizable display element of a dialog box 44 with an inheritance scheme. It should be understood that any time a piece of software, such as, for example, client application 42, resource manager 43, dialog boxes 44, and/or configuration manager 45 is described as performing a method, process, step, or function, in actuality what is meant is that a computing device (e.g., computing device 32) on which that piece of software is running performs the method, process, step, or function when executing that piece of software on its processor (e.g., processor 38). It should also be understood that, in some embodiments, instead of processor 38 executing code of client application 42, resource manager 43, dialog boxes 44, and/or configuration manager 45, specialized circuitry of the mobile computing device 32 operates to perform the method, process, step, or function directly in hardware. Method 100 may be performed by resource manager 43 upon receiving a command from a dialog box 44 (e.g., child dialog box 44C) to localize a localizable display element for display within dialog box GUI 35.

In step 110, resource manager 43 searches the bundle 46 associated with the current dialog box 44 for a display term mapped to be the non-localized element name of the localizable display element. The current dialog box 44 is the dialog box atop a search stack. The search stack starts off including only the dialog box 44 that issued the original localization request (e.g., child dialog box 44C), although in later iterations, the top element of the search stack will be a different dialog box 44). As depicted, searching the bundle 46 includes first searching a first properties file 48 of the bundle 46 according to the chain order 62 for that dialog box 44 (sub-step 112), and proceeding to the remaining properties files 48 of the bundle 46 according to the chain order 62 until reaching the last (default) properties file 48 of the bundle in the chain order 62 (sub-step 114). In some embodiments, searching the bundle 46 includes searching through the properties files 48 of the bundle 46 (according to the chain order 62, as described above) for a key-value pair having a key equal to the non-localized element name of the localizable display element and selecting the value mapped to by that key, if the key is found within the bundle 46. An example non-localized element name is the key DeletionConfirmation for localizable display element 58, which localizes to values "Delete Key" or "Borrar el Archivo" depending whether the language is English or Spanish within intermediate bundle 46B.

In step 120, resource manager 43 evaluates whether or not the display term for the localizable display element has been found within step 110. If it has, then execution proceeds to step 130, in which resource manager causes the found display term to be displayed within the dialog box GUI 35 in the place indicated by the location of the localizable display element within the dialog box 44 that originally issued the localization call to the resource manager 43. In some embodiments, step 130 may be performed by the dialog box 44 itself rather than the resource manager 43.

On the other hand, if step 120 evaluates negatively, then execution proceeds to step 140. In step 140, resource manager 43 checks whether the current bundle 46 (i.e., the bundle 46 associated with the dialog box 44 currently at the top of the search stack) inherits from any other dialog box 44. This step may be performed by the resource manager 43 looking for an #inherit instruction within the last properties file 48 within bundle 46 according to the chain order 62. In some embodiments, #inherit instructions may be found in any properties files 48 of the bundle 46, but in many embodiments, #inherit instructions are ignored unless located within the last properties file 48 within bundle 46 according to the chain order 62. If there is an #inherit instruction, then the current dialog box is deemed to inherit from the listed dialog box. If there are multiple #inherit instructions (or if there is a single instruction listing multiple dialog boxes), then an order is assigned (typically the order in which the inheritances are listed) for inheritance to proceed in. In some embodiments, in order to prevent infinite loops, if the listed dialog box 44 from which the current dialog box 44 inherits is already listed within the search stack, then the listed dialog box 44 is skipped, proceeding to the next inherited dialog box (or, if there are no more, then returning a negative value for inheritance). If there is a dialog box 44 from which the current dialog box 44 inherits, then step 140 yields a positive value, and execution proceeds with step 150.

In step 150, resource manager 43 adds the dialog box 44 from which the current dialog box 44 inherits to the top of the search stack, thereby updating the identity of the current dialog box 44. Then execution proceeds to step 110 for a search of the new current dialog box 44 for the display term mapped to be the non-localized element name of the localizable display element.

On the other hand, when step 140 yields a negative result, execution proceeds with step 160. In step 160, resource manager 43 evaluates whether or not the search stack can be popped. If the current dialog box 44 is the last element on the stack, then the stack cannot be popped; since the display term mapped to be the non-localized element name of the localizable display element has not yet been found and the search stack is empty, there has been an error. Thus, execution proceeds to step 180, in which resource manager 43 logs an error. This may happen, for example, during development and debugging. As another example, an error may occur when an installation has been corrupted or when the localization for an obscure locale has been insufficiently tested. The logged error may help system administrators to determine what is wrong with the localization configuration.

On the other hand, if step 160 yields a positive result (i.e., the search stack can be popped), the operation proceeds to step 170, in which resource manager 43 pops the stack, thereby returning to the previous current dialog box 44. Then operation proceeds with step 140 to determine whether the current dialog box 44 inherits from any additional dialog boxes 44.

Ultimately, execution will terminate either with step 130 or with step 180. Method 100 can then be repeated for every localizable display element for each dialog box 44 that is to be displayed within dialog box GUI 35.

It should be understood that although method 100 has been described as being performed by resource manager 43, some steps of method 100 may, in fact, be delegated to other classes and functions, not being performed directly be resource manager 43.

Thus, techniques have been described for enabling inheritance of properties files 48 between related dialog boxes 44 of a dialog box GUI 35 while also providing for localization.

While various embodiments of the present disclosure have been particularly shown and described, it will be understood by those skilled in the art that various changes in form and details may be made therein without departing from the spirit and scope of the present disclosure as defined by the appended claims.

For example, although various embodiments have been described as being methods, software embodying these methods is also included. Thus, one embodiment includes a tangible non-transitory computer-readable storage medium (such as, for example, a hard disk, a floppy disk, an optical disk, computer memory, flash memory, etc.) programmed with instructions, which, when performed by a computer or a set of computers, cause one or more of the methods described in various embodiments to be performed. Another embodiment includes a computer which is programmed to perform one or more of the methods described in various embodiments.

Furthermore, it should be understood that all embodiments which have been described may be combined in all possible combinations with each other, except to the extent that such combinations have been explicitly excluded.

Finally, even if a technique, method, apparatus, or other concept is specifically labeled as "conventional," Applicants make no admission that such technique, method, apparatus, or other concept is actually prior art under 35 U.S.C. §102, such determination being a legal determination that depends upon many factors, not all of which are known to Applicants at this time.

What is claimed is:

1. A method of displaying a graphical user interface (GUI) of a first dialog box on a display screen of a computing device, the method comprising, for a localizable display element of a set of localizable display elements of the first dialog box, each localizable display element having a non-localized element name:

searching through a first chain of properties files of the first dialog box for a display term mapped to by the non-localized element name of the localizable display element;

in response to searching through the first chain of properties files, determining that the display term mapped to by the non-localized element name of the localizable display element is not found within the first chain of properties files;

in response to determining that the display term mapped to by the non-localized element name of the localizable display element is not found within the first chain of properties files, further searching through a second chain of properties files associated with a second dialog box for the display term mapped to by the non-localized element name of the localizable display element, the first chain of properties files being pre-configured to inherit properties from the second chain of properties files; and when the display term mapped to by the non-localized element name of the localizable display element is found within the second chain of properties files, displaying the display term mapped to by the non-localized element name of the localizable display element found within the second chain of properties files in place of the localizable display element of the first dialog box on the GUI of the first dialog box on the display screen of the computing device.

2. The method of claim 1 wherein:

the GUI of the first dialog box is configured to display language-specific features defined by a local language as well as common features defined by a default language distinct from the local language, the first dialog box being further configured to inherit display terms from the second dialog box;

the first chain of properties files includes a first properties file of the first dialog box for the local language, the first properties file preceding, in a first search order, a second properties file of the first dialog box for the default language;

searching through the first chain of properties files for the display term mapped to by the non-localized element name of the localizable display element includes searching through properties files of the first chain of properties files in accordance with the first search order;

the second chain of properties files includes a third properties file of the second dialog box for the local language preceding, the second properties file preceding, in a second search order, a fourth properties file of the second dialog box for the default language; and searching through the second chain of properties files for the display term mapped to by the non-localized element name of the localizable display element includes searching through properties files of the second chain of properties files in accordance with the second search order.

3. The method of claim 2 wherein:

the GUI of the first dialog box is configured to display vendor-specific features defined by a licensed vendor as well as common features defined by a manufacturer distinct from the licensed vendor;

the first chain of properties files further includes a first vendor-specific properties file of the first dialog box within the first search order; and the second chain of properties files further includes a second vendor-specific properties file associated with the second dialog box within the second search order.

4. The method of claim 1 wherein:

each properties file of the first chain of properties files includes a respective set of key-value pairs, each respective key-value pair mapping from a non-localized element name of a localizable display element of the first dialog box to a respective display term;

searching through the first chain of properties files for the display term mapped to by the non-localized element name of the localizable display element includes searching through properties files of the first chain of properties files for a key-value pair having a key equal to the non-localized element name of the localizable display element and selecting the value mapped to by that key, if found;

each properties file of the second chain of properties files includes a respective set of key-value pairs, each respective key-value pair mapping from a non-localized element name of a localizable display element of the second dialog box to a respective display term; and searching through the second chain of properties files for the display term mapped to by the non-localized element name of the localizable display element includes searching through properties files of the second chain of properties files for a key-value pair having a key equal to the non-localized element name of the localizable display element and selecting the value mapped to by that key, if found.

5. The method of claim 1 wherein a properties file of the first chain of properties files includes an inherit command indicating inheritance of properties from the second chain of properties files.

6. The method of claim 5 wherein:

the properties file of the first chain of properties files further includes another inherit command indicating inheritance of properties from a third chain of properties files of a third dialog box, the inheritance from the third chain of properties files being of inferior precedence to the inheritance from the second chain of properties files;

in response to searching through the second chain of properties files, determining that the display term mapped to by the non-localized element name of the localizable display element is not found within the second chain of properties files;

in response to determining that the display term mapped to by the non-localized element name of the localizable display element is not found within the second chain of properties files, further searching through the third chain of properties files for the display term mapped to by the non-localized element name of the localizable display element; and when the display term mapped to by the non-localized element name of the localizable display element is found within the third chain of properties files, displaying the display term mapped to by the non-localized element name of the localizable display element found within the third chain of properties files in place of the localizable display element of the first dialog box on the GUI of the first dialog box on the display screen of the computing device.

7. The method of claim 6 wherein, when the display term mapped to by the non-localized element name of the localizable display element is not found within the third chain of properties files, logging an error.

8. The method of claim 5 wherein:

the properties file of the second chain of properties files includes another inherit command indicating inheritance of properties from a third chain of properties files of a third dialog box;

in response to searching through the second chain of properties files, determining that the display term mapped to by the non-localized element name of the localizable display element is not found within the second chain of properties files;

in response to determining that the display term mapped to by the non-localized element name of the localizable display element is not found within the second chain of properties files, further searching through the third chain of properties files for the display term mapped to by the non-localized element name of the localizable display element; and when the display term mapped to by the non-localized element name of the localizable display element is found within the third chain of properties files, displaying the display term mapped to by the non-localized element name of the localizable display element found within the third chain of properties files in place of the localizable display element of the first dialog box on the GUI of the first dialog box on the display screen of the computing device.

9. The method of claim 8 wherein:
further searching through the third chain of properties files for the display term mapped to by the non-localized element name of the localizable display element includes:
 sending a search stack indicating that the second chain of properties files is being searched in furtherance of searching the first chain of properties files;
 determining that the third chain of properties files is equivalent to the first chain of properties files from within the search stack; and
 in response to determining that the third chain of properties files is equivalent to the first chain of properties files from within the search stack, ceasing to search within the third chain of properties files for the display term mapped to by the non-localized element name of the localizable display element.

10. The method of claim 8 wherein, when the display term mapped to by the non-localized element name of the localizable display element is not found within the third chain of properties files, logging an error.

11. The method of claim 1 wherein, when the display term mapped to by the non-localized element name of the localizable display element is not found within the second chain of properties files, logging an error.

12. A computer program product comprising a non-transitory computer-readable storage medium storing instructions which, when executed by a computing device, cause the computing device to display a graphical user interface (GUI) of a first dialog box on a display screen of the computing device by, for a localizable display element of a set of localizable display elements of the first dialog box, each localizable display element having a non-localized element name:
 searching through a first chain of properties files of the first dialog box for a display term mapped to by the non-localized element name of the localizable display element;
 in response to searching through the first chain of properties files, determining that the display term mapped to by the non-localized element name of the localizable display element is not found within the first chain of properties files;
 in response to determining that the display term mapped to by the non-localized element name of the localizable display element is not found within the first chain of properties files, further searching through a second chain of properties files associated with a second dialog box for the display term mapped to by the non-localized element name of the localizable display element, the first chain of properties files being pre-configured to inherit properties from the second chain of properties files; and
 when the display term mapped to by the non-localized element name of the localizable display element is found within the second chain of properties files, displaying the display term mapped to by the non-localized element name of the localizable display element found within the second chain of properties files in place of the localizable display element of the first dialog box on the GUI of the first dialog box on the display screen of the computing device.

13. An apparatus comprising:
a display interface for displaying a graphical user interface (GUI) of a first dialog box on a display screen;
memory, the memory storing a first chain of properties files of the first dialog box and a second chain of properties files associated with a second dialog box; and
a controller, the controller being configured to, for a localizable display element of a set of localizable display elements of the first dialog box, each localizable display element having a non-localized element name:
 search through the first chain of properties files for a display term mapped to by the non-localized element name of the localizable display element;
 in response to searching through the first chain of properties files, determine that the display term mapped to by the non-localized element name of the localizable display element is not found within the first chain of properties files;
 in response to determining that the display term mapped to by the non-localized element name of the localizable display element is not found within the first chain of properties files, further search through a second chain of properties files associated with a second dialog box for the display term mapped to by the non-localized element name of the localizable display element, the first chain of properties files being pre-configured to inherit properties from the second chain of properties files; and
when the display term mapped to by the non-localized element name of the localizable display element is found within the second chain of properties files, display the display term mapped to by the non-localized element name of the localizable display element found within the second chain of properties files in place of the localizable display element of the first dialog box on the GUI of the first dialog box on the display screen of the computing device.

* * * * *